(12) United States Patent
Gross et al.

(10) Patent No.: US 6,171,079 B1
(45) Date of Patent: Jan. 9, 2001

(54) DRIVE UNIT

(75) Inventors: Gerhard Gross, Lauf; Peter Nolting, Buehlertal; Bruno Santarossa, Egenheusen, all of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/210,021

(22) Filed: Dec. 11, 1998

(30) Foreign Application Priority Data

Dec. 16, 1997 (DE) .............................. 197 55 805

(51) Int. Cl.[7] .............................. F04B 17/00; F01D 25/04
(52) U.S. Cl. .............................. 417/423.12; 417/410.1; 415/119
(58) Field of Search ................ 417/423.12, 423.14, 417/410.1; 415/119

(56) References Cited

U.S. PATENT DOCUMENTS

| | | | |
|---|---|---|---|
| 4,445,821 | * 5/1984 | Watanabe et al. .................. | 417/366 |
| 4,844,621 | * 7/1989 | Umemura et al. .................. | 415/119 |
| 5,110,266 | * 5/1992 | Toyoshima et al. ................. | 417/312 |
| 5,786,647 | * 7/1998 | Vollmer et al. ..................... | 310/89 |

* cited by examiner

Primary Examiner—Noah P. Kamen
Assistant Examiner—Mahmoud M Gimie
(74) Attorney, Agent, or Firm—Michael J. Striker

(57) ABSTRACT

A drive unit for a radial blower has an electric motor including a driven shaft with a bearing for said driven shaft, and a motor housing provided with bearing pins which coaxially project at an end side of the motor housing and surrounds the bearing, a housing which receives the electric motor and has holders engaged in the bearing pins, at least one damping element composed of an elastic material and inserted between one of the bearing pins and one of the holders to radially and axially support the electric motor, the damping element being composed of a plurality of roller bodies having radially oriented body axes, the roller bodies being offset relative to one another and connected with one another with substantially constant distances there between.

16 Claims, 2 Drawing Sheets

DRIVE UNIT

BACKGROUND OF THE INVENTION

The present invention relates to a drive unit, in particular for radial blowers.

Drive units of the above mentioned general type are known in the art. One of such radial blowers is disclosed for example in the German patent document DE 43 34 124 A1. The drive unit in this reference has a damping element assembled from a sleeve which is fitted on a bearing pin and a damping bushing composed of elastic material and mounted on the outer wall of the sleeve. The damping bushing engages over the holder at both end sides with radially extending brackets. For non-rotatable fixation of the damping element in the holder, the latter has a cam-shaped projections which engage in associated depressions in the damping bushing. Such a damping element eliminates motor vibrations and reduces the disturbing noises.

SUMMARY OF THE INVENTION

Accordingly, it is an object of present invention to provide a drive unit of the above mentioned general type, which offers some new advantages in the face of the prior art.

In keeping with these objects and with others which will become apparent hereinafter, one feature of present invention resides, briefly stated, in a drive unit in which the damping element has a plurality of roller bodies with radially oriented body axes which are arranged so that they are offset relative to one another, preferably with an identical peripheral angle, and connected with one another substantially at constant distances.

When the drive unit is designed in accordance with the present invention, it has the advantage that through the roller bodies of the damping element, the electric motor can tangentially swing in a defined region. In addition, the electric motor which can have an open or closed design can be pressed-in between two housing surfaces axially non-displaceably, and the axial motor and housing tolerances can be compensated. An expensive fixed bearing can be dispensed with. With corresponding deformation properties of the roller bodies of the damping element which can be composed for example of rubber, the pressing forces on the bearing points of the electric motor can be determined without problems, so that in the open design of the electric motor its bearing brackets are not deformed and the axial gap of the electric motor is maintained within the required tolerance region.

The damping element in accordance with the present invention performs a double function. In particular, on the one hand it guarantees a vibration reducing and noise reducing suspension of the motor in the housing. On the other hand, it takes up dimensional tolerances in the axial direction. Thereby a cost favorable clip mounting of the motor is possible, which substantially simplifies the mounting.

In accordance with a preferable embodiment of the invention, two damping elements are provided one each bearing pin of the electric motor, at the side of the collector and at the output side. Therefore the electric motor is suspended softer and a higher noise reduction is obtained.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
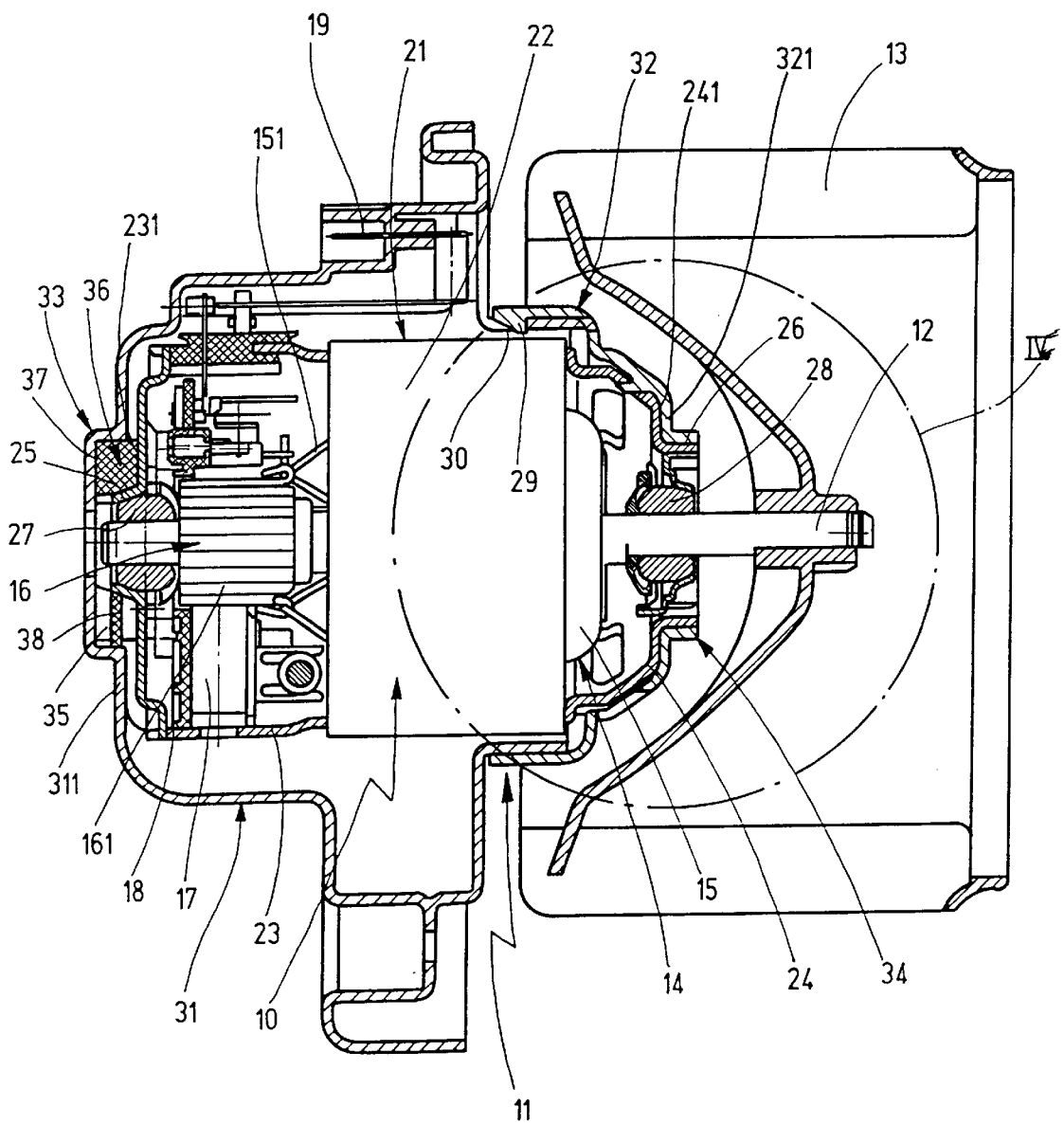
FIG. 1 is view showing a longitudinal section of an electric motor drive unit for a radial blower.

FIG. 1 shows a longitudinal section of a drive unit with a radial blower as an example for an electric motor drive unit in accordance with the present invention. It has an electric motor 10 formed as a commutator motor which is accommodated in the housing 11 and provided with a motor or driven shaft 12 extending outwardly of the housing 11. A blower wheel or impeller 13 is mounted on the driven shaft 12. An armature or rotor 14 with an armature winding 15 is arranged on the driven shaft 12 in a known manner. Coil ends 151 of the armature winding 15 are connected to commutator plates 161 of a commutator or collector 16 which is non rotatably mounted on the driven shaft 12.

The current supply to the armature 15 is performed in a known manner through at least two carbon brushes 17 which are radially displaceably guided in a brush holder 18 and are pressed under the pressure of the brush springs against the commutator plates 161 of the commutator 16. The carbon brushes 17 are electrically conductively connected with a connector plug 19. The rotor 15 is surrounded by a stator 21, of which a closure pipe forming a motor housing 22 is shown. Bearing bracket 23 and 24 are arranged at both end-side ends of the tube or the motor housing 22. The bearing bracket 23 bridges the commutator 15 and supports the brush holder 18. The bearing pins 25 and 26 are coaxially formed in bearing brackets 23 and 24. Sliding bearings 27 and 28 for the driven shaft 12 are located in the bearing pin 25 and 26 correspondingly.

The housing 1 is composed of two parts including a housing casing 31 and a housing cap 32 which is clipsed with the housing 31 casing 31. The clipsing is performed by several arresting projections 29 which are formed on the housing cap 32 and engage in corresponding arresting holes 30 in the housing casing 31. FIG. 1 shows a plurality of arresting connections which are preferably uniformly distributed over the periphery of the housing casing 31 and the housing cap 32 and include arresting projections 29 and arresting holes 30.

Holders 33 and 34 for the electric motor 10 are formed coaxially on the casing bottom 311 of the housing casing 31 and on the cap bottom 321 of the housing cap 32. The holder 33 is formed by a bottom depression 35 which is pressed in the casing bottom 311. The bearing pin 25 partially engages in the bottom depression 35 and is fixed radially non-displaceably by a damping element 36. The damping element 36 which is composed of an elastic material, preferably rubber is shown on a plan view of FIG. 2 and in a section in FIG. 3. It has a plurality of roller bodies 37, here five roller bodies. The roller bodies are arranged so that their radially oriented body axes are offset relative to one another, preferably by identical peripheral angle, and they are connected with one another by a ring disc 38. The roller bodies 37 and the ring disc 38 are formed of one piece with one another. When compared with the diameter of the roller bodies 37, the ring disc 38 which has a substantially smaller thickness is set centrally on the roller bodies 37 and is located in the plane of symmetry of the damping element 36.

Figure 2:
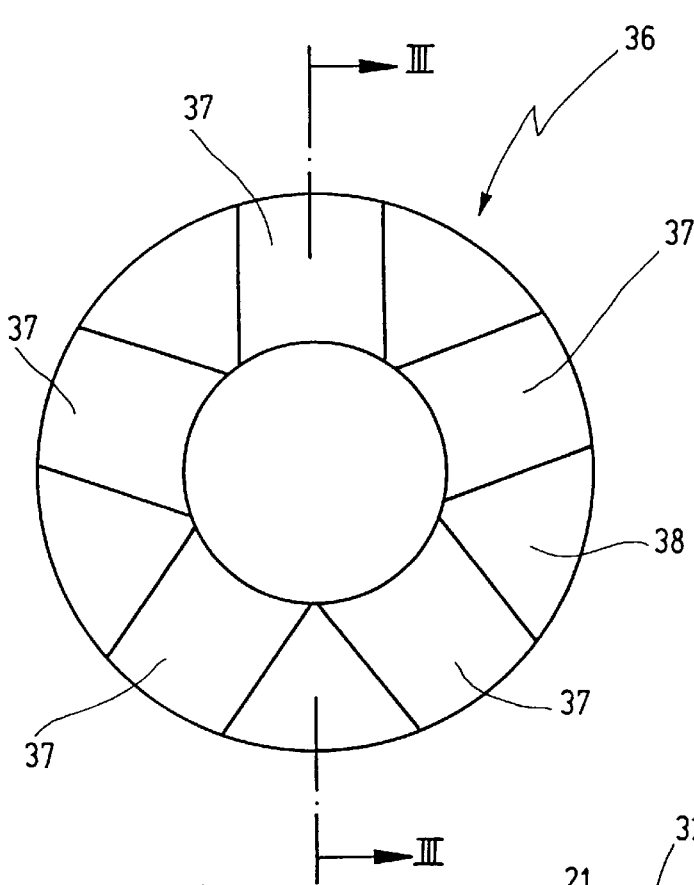
FIG. 2 is a plan view of a damping element of the drive unit of FIG. 1.
Figure 3:
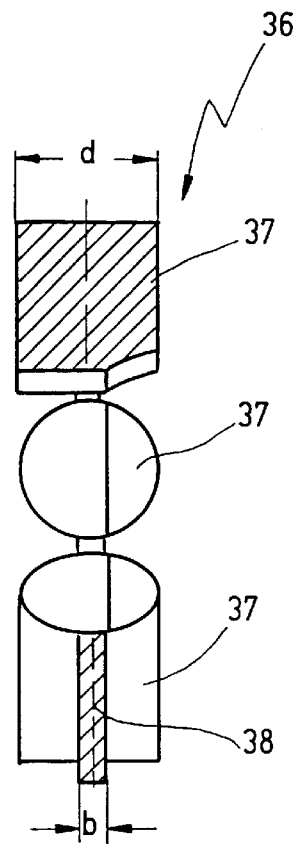
FIG. 3 is a view showing a section taken along the line III–II in FIG. 2.

In FIG. 3 the axial thickness of the ring disc 38 is identified with b and the diameter of the roller body 37 formed at both sides of the ring disc 38 is identified with d. The roller bodies 37 in the embodiment of FIGS. 1–3 are cylindrical and have a circular cross-section. Alternatively, the roller bodies 37 can be barrel-shaped or cone-shaped and also can have an elliptical cross-section. The damping element 37 which is formed as described above, is inserted with a radial press fit in the holder 35. Its bottom forms an axial abutment for the damping element 36. The holder 35 on the housing cap 32 is formed by a ring-shaped collar 39 which projects axially at the cap bottom 321 and receives the bearing pin 26 of the electric motor radially in a form-locking manner.

For mounting of the drive unit, the electric motor 10 is inserted in the housing casing 31. The bearing pin 25 is introduced into the damping element 36 inserted in the bottom depression 35, and the bearing bracket 23 with an abutment shoulder 231 abuts axially against the roller bodies 37. Now the housing cap 32 is placed from the free end of the driven shaft 12 on the housing casing 31, the collar 39 engages the bearing pin 26 and the cap bottom 321 abuts against a supporting shoulder 241 of the bearing bracket 24. The housing cap 32 is fitted on the housing casing 31 by an axial pressure until the arresting projections 19 engage in the arresting holes 30. Thereby the electric motor 10 can be held axially without a gap in the housing 11, and due to the roller bodies 37 can swing tangentially within a predetermined region, so that its vibrations and noise are transmitted through the housing 11 with a substantially reduced value.

Due to the deformability of the roller body 37 of the damping element 36, the axial motor and housing tolerances during the assembly of the drive unit can be compensated. The deformation properties of the roller bodies 37 are determined by pressing forces which are permitted for the bearing points of the electric motor 10, so that during pressing of the electric motor 10 between the housing casing 31 and the housing curb 13 it is guaranteed that the bearing brackets 23, 24 are not deformed. Since the deformation of the bearing brackets 23, 24 is prevented, the axial gap of the electric motor 10 is maintained within the required tolerance region. For determination of the deformation properties, the rollers 37 can be formed barrel-shaped, conical or cylindrical with a circular or elliptic cross-section.

Figure 4:
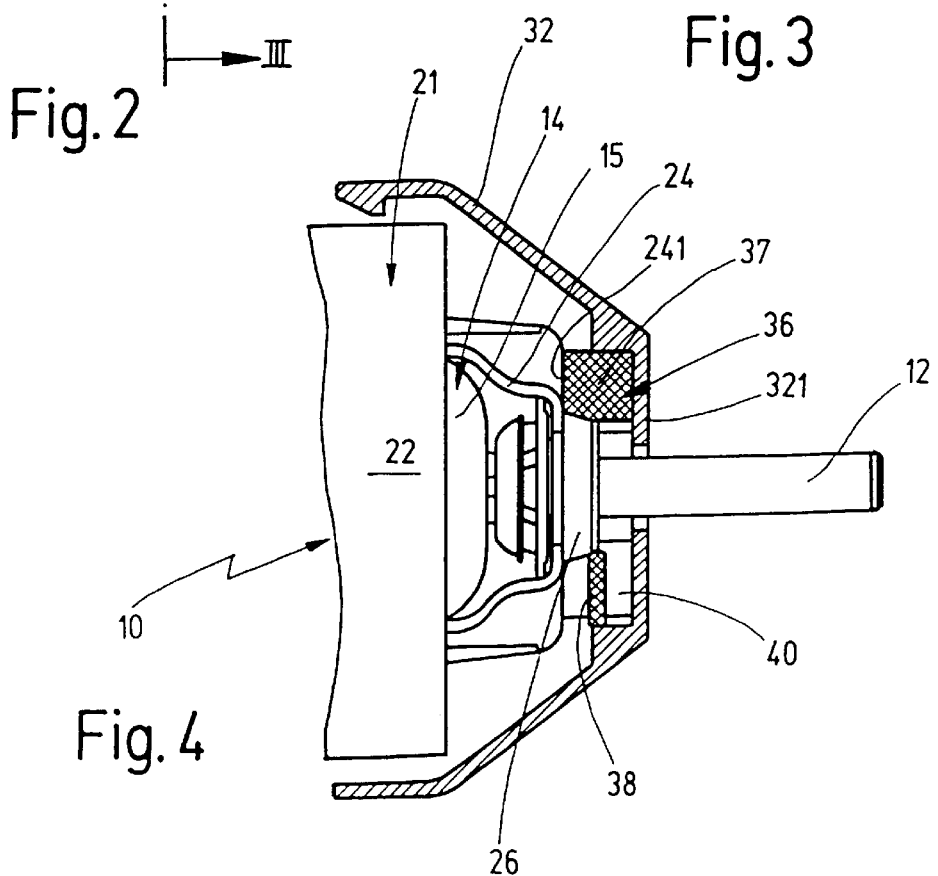
FIG. 4 is a view showing a section IV in FIG. 1 with a modification of the drive unit.

In the embodiment of the drive unit shown in FIG. 4, the holder 34 which is located at the side of the housing cap is modified so that it is formed identically to the holder 33 in FIG. 1. A bottom depression 40 is formed in the cap bottom 321, and the damping element 33 of FIGS. 2 and 3 is inserted in it with radial press fit. As with the holder 33 in FIG. 1, the damping element 36 is inserted only partially, to the ring disc 38, in the bottom depression 40, since its depths substantially corresponds to half diameter of the roller bodies 37. With the assembled housing 11, the bearing pin 26 is inserted in the interior of the ring disc 38 until the bearing bracket 34 abuts with its abutment shoulder 241 against the roller bodies 37, which in turn are supported axially against the bottom of the bottom depression 40. With the second damping element 36, the electric motor when compared with the embodiment of FIG. 1 having only one damping element 36, is suspended substantially softer and therefore a greater noise reduction is provided.

The invention is not limited to the shown examples. For example the electric motor does not have, as described, to be formed with an open design in which the bearing pins 25, 26 are held by the bearing brackets 23, 24 on the motor housing. In the same way a close design can be provided as well, in which the bearing pins are formed directly on the motor housing wall and received in the housing 11, so that the above described advantages are obtained here as well.

It will be understood that each of the elements described above, or two or more together, may also find a useful application in other types of constructions differing from the types described above.

While the invention has been illustrated and described as embodied in drive unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive unit for a radial blower, comprising an electric motor including a driven shaft with a bearing for said driven shaft, and a motor housing provided with bearing pins which coaxially project at an end side of said motor housing and surrounds said bearing; a housing which receives said electric motor and has holders engaged in said bearing pins; at least one damping element composed of an elastic material and inserted between one of said bearing pins and one of said holders to radially and axially support said electric motor, said damping element being composed of a plurality of roller bodies having radially oriented body axes, said roller bodies being offset relative to one another and connected with one another with substantially constant distances therebetween.

2. A drive unit as defined in claim 1, wherein said roller bodies are offset relative to one another by identical peripheral angles.

3. A drive unit as defined in claim 1; and further comprising means for connecting said roller bodies with one another and including a ring disc on which said roller bodies are formed symmetrically and of one piece with said ring disc.

4. A drive unit as defined in claim 3, wherein an axial thickness of said roller disc is substantially smaller than an outer diameter of said roller bodies, said ring disc being arranged centrally on said roller bodies.

5. A drive unit as defined in claim 1, wherein said roller bodies have a shape selected from the group consisting of a cylindrical shape, a barrel shape and a conical shape, said roller bodies having a cross-section selected from the group consisting of a circular cross-section and an elliptical cross-section.

6. A drive unit as defined in claim 1, wherein said damping element is inserted in said holder with a radial press fit.

7. A drive unit as defined in claim 1, wherein said housing has a housing casing provided with a casing bottom on which said holder is coaxially formed, and a housing cap which closes said housing casing and having a cap bottom with a coaxially formed another holder, so that one of said holders which receives said damping element has an axial abutment for said damping element, said motor housing being clamped between said roller bodies of said damping element and an element selected from the group consisting of said housing cap and said housing casing.

8. A drive unit as defined in claim 7, wherein said holder which is formed on said casing bottom is formed as a bottom depression of said casing bottom in which said damping element is partially inserted with a press fit, said motor housing having support shoulders facing said casing bottom and said cap bottom, one of said support shoulders abutting against said roller bodies while the other of said support shoulders abutting against a corresponding abutment on said cap.

9. A drive unit as defined in claim 8, wherein said the other of said abutment shoulders abuts against said cap bottom.

10. A drive unit as defined in claim 7, wherein said holders are formed as bottom depressions in which a corresponding one of said damping elements abuts partially with a press fit, said motor housing having abutment shoulders which face said housing bottom and said cap bottom and each supported against said roller bodies.

11. A drive unit as defined in claim 10, wherein an axial depth of said bottom depressions in said casing bottom and said cap bottom is smaller than an outer diameter of said roller bodies.

12. A drive unit as defined in claim 11, wherein the axial depth of said bottom depressions of said casing bottom and said cap bottom amounts to a half outer diameter of said roller bodies.

13. A drive unit as defined in claim 1, wherein said housing cap is clipsed on said housing casing.

14. A drive unit as defined in claim 1, wherein said bearing pins are held on said motor housing through said bearing brackets.

15. A drive unit as defined in claim 1, wherein said damping element is composed of rubber.

16. A drive unit for a radial blower, comprising an electric motor including a driven shaft with a bearing for said driven shaft, and a motor housing provided with bearing pins which coaxially project at an end side of said motor housing and surrounds said bearing; a housing which receives said electric motor and has holders engaged in said bearing pins; at least one damping element composed of an elastic material and inserted between one of said bearing pins and one of said holders to radially and axially support said electric motor, said damping element being composed of a plurality of roller bodies having radially oriented body axes and cylindrical surfaces formed around said body axes, said roller bodies being offset relative to one another and connected with one another with substantially constant distances therebetween, each of said roller bodies extending radially from an inner surface of said one holder to an outer surface of said one bearing pin.

* * * * *